United States Patent

Koens et al.

[15] 3,698,072

[45] Oct. 17, 1972

[54] VALIDATION TECHNIQUE FOR INTEGRATED CIRCUIT MANUFACTURE

[72] Inventors: Jeffrey G. Koens, Wappingers Falls; Robert D. Merillat, Hopewell Junction, both of N.Y.

[73] Assignee: International Business Machines Corporation, Armonk, N.Y.

[22] Filed: Nov. 23, 1970

[21] Appl. No.: 91,972

[52] U.S. Cl. ..........................29/574, 29/593, 29/625

[51] Int. Cl. ............................................H01l 19/00

[58] Field of Search.........29/625, 624, 626, 574, 593

[56] References Cited

UNITED STATES PATENTS 3,461,547 8/1969 Di Curcio....................29/574

3,598,604 8/1971 De Puy........................29/576

*Primary Examiner*—J. Spencer Overholser
*Assistant Examiner*—Norman E. Lehrer
*Attorney*—Hanifin and Jancin and Martin G. Reiffin

[57] ABSTRACT

A method of making an integrated circuit involves first placing the digital information characterizing the circuit into two separate and different formats. The latter are then transmitted to the manufacturing plant where they are compared. The two formats are then used to form respective artworks depicting a mask for making the integrated circuit. The artworks are then compared. The integrated circuit is then built from the information of one of said formats and is compared with the information in the other format.

11 Claims, 1 Drawing Figure

PATENTED OCT 17 1972 3,698,072
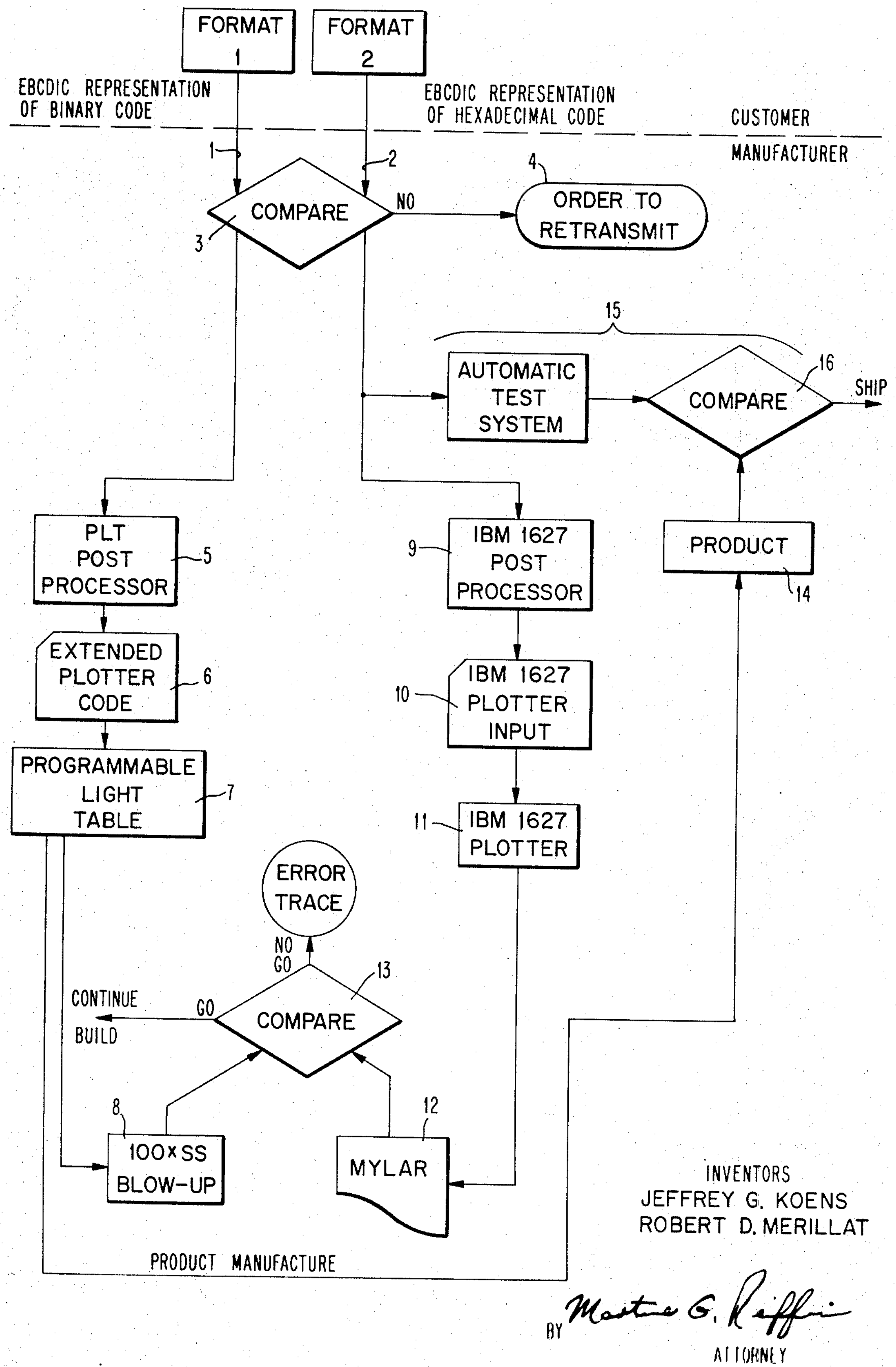
INVENTORS
JEFFREY G. KOENS
ROBERT D. MERILLAT
BY Martin G. Reiffin
ATTORNEY

VALIDATION TECHNIQUE FOR INTEGRATED CIRCUIT MANUFACTURE

FIELD OF THE INVENTION

In the present state of the art of manufacturing integrated circuits it is common practice for the customer to transmit to the manufacturing plant the data characterizing the circuit to be built by the manufacturer for the customer. Even a single error in the data utilized by the manufacturer will result in a defective product and the loss of time and money. Therefore it is extremely important to assure that the final integrated circuit product conforms to the original data, and in particular to determine that no errors occurred during the transmission of the data to the manufacturer or during the mask-making process.

DESCRIPTION OF THE PRIOR ART

In the prior art an attempt was made to eliminate errors by presenting the data in two different formats: a chip schematic and a digitized layout. These formats were converted to the same language and then compared. See "A Computer-Aided Method for Checking and Making Monolithic Integrated Circuit Masks" by D. M. Sheppard, W. T. James, M. E. Harris, and A. M. Barone presented at the Western Electronic Show and Convention, Aug. 23–26, 1966. However there was no assurance that either of the two formats was in accordance with the original design data characterizing the integrated circuit chip. Furthermore, data transmission from one location to another was not involved.

SUMMARY OF THE INVENTION

It is therefore a primary object of the present invention to provide a method of making an integrated circuit which is virtually foolproof and which will assure that the final product conforms to the original chip design.

Another object is to provide a plurality of checks and comparisons during the circuit manufacturing process so as to detect any errors before manufacture of a defective product.

These objects are achieved by a novel arrangement for repeatedly checking the received data, the masks and the final product against the data originally transmitted from the customer to the manufacturer.

Other objects and advantages of the present invention are either inherent in the structure and method disclosed herein or will become apparent to those skilled in the art as the detailed description proceeds in connection with the accompanying drawing.

DESCRIPTION OF THE DRAWING

The drawing shows a flow diagram depicting the successive steps of the method in accordance with the subject invention.

DESCRIPTION OF THE PREFERRED EMBODIMENT

The method of making an integrated circuit in accordance with the present invention commences when the customer sends to the manufacturer an order for a so-called "part number," that is, a particular circuit design. The integrated circuit is specified by a truth table designating a bit pattern which defines the functional logic of the required circuit as an array of, say, 512 "1" and "0" bits.

The manufacturer maintains a stock pile of integrated circuit wafers which have all circuits active, corresponding to an array where all the transistors are connected and designating in each instance the "1" bits. When the bit pattern array is received from the customer, a mask is made with a tab, that is, a 2 × 4 mil. rectangle, appearing on the mask wherever a "0" bit appears in the bit pattern array. This mask is superimposed on a photoresist layer on the master-slice wafer, the photoresist is exposed to light through the mask, the unexposed portions of the photoresist are removed, and the circuit portions under the tabs are etched away, leaving a circuit corresponding to the user's functional requirement.

Since the customer's order consists of a simple bit pattern, it is vulnerable to accidental error such as the loss or interposition of one or more bits. In order to obviate this possibility, each order is transmitted from the customer to the manufacturer in two separate and distinct formats. For example, the first format may consist of a binary bit pattern encoded in EBCDIC (Extended Binary Coded Decimal Interchange Code). A pattern such as 1011001111000110... would then be expressed as F1F0F1F1F0F0F1F1F1F1F0F0F0F1F1F0.... The second format may consist of the hexadecimal representation of the bit pattern encoded in EBCDIC. For example, the hexadecimal representation of the above pattern would be B3C6... and encoded in EBCDIC it would be C2F3C3F6...

Both formats contain the same information but in different and distinct forms which act as a check against accidental error. For instance, to interpose the second and third bits of the proceeding pattern without detection, the first format would have to read F1F1F0F1.... and the second format would have to become C4F3.... Such an alteration is almost impossible over lines that are safe-guarded by parity and check-sum protection.

Referring to the drawing, the two formats comprising the customer's order at 1 and 2 are received by the manufacturer and are immediately compared at 3 to be certain the information content of each is identical. The comparison consists of decoding each pattern to a bit string an comparing corresponding bits one at a time. If the comparison fails to indicate identity at any point, the order is rejected at 4 and the customer is required to retransmit the order. If the two valid formats are accepted by the manufacturer, one format is used to build a product and the other format is used as a constant reference to assure integrity of all subsequent manufacturing hardware and software operations.

The data in the first format is processed at 5 with a program called a programmable light table postprocessor to generate a program card deck designated an extended plotter code at 6. The latter specifies a series of signals for driving a programmable light table designated at 7. The light table 7 generates onto a photographic plate the array of tabs corresponding to the mask which is to be used to manufacture the integrated circuit. The image is ten times life size and the mask is made from the plate by a standard photographic reduction step-and-repeat technique. The plate exposed by the programmable light table is then magnified to a hundred times life size at 8.

The second format has been processed by a program referred to at 9 as the IBM 1627 post-processor which converts the second format into plotter input signals to drive an IBM 1627 plotter indicated at 11. The latter then generates a 100 times life size enlargement of the array of tabs designated by the second format. This enlargement is on translucent mylar and is indicated at 12. The two artworks generated at 8 and 12 are then compared at 13 by superimposing the mylar artwork over the other artwork to see that the tabs correspond in each case. If no discrepancy is indicated, the integrated circuit is manufactured from the plate generated by the programmable light table at 7 to provide a product at 14. This product is then checked by an automated test system indicated at 15 by comparing at 16 the product with the second format originally specified. The identity between the specified design and the finished product is thus assured.

It is to be understood that the specific embodiment disclosed herein is merely illustrative of one of the many forms which the invention may take in practice without departing from the scope of the invention delineated in the appended claims, and that the claims are to be construed as broadly as permitted by the prior art.

We claim:

1. A method of processing information for making an integrated circuit comprising the steps of transmitting from a customer's location to a manufacturing plant two separate and different formats of digital information each defining the integrated circuit to be made, comparing said two formats at the manufacturer's location, forming from a first of said formats a first enlarged artwork depicting a mask for making said integrated circuit, forming from the second of said formats a second enlarged artwork depicting said mask for making said integrated circuit, and comparing said artworks to determine whether they correspond.

2. A method as recited in claim 1 and comprising the steps of building an integrated circuit in accordance with the information of said first format, and comparing said built integrated circuit with the information of said second format.

3. A method of processing information for making an integrated circuit comprising the steps of transmitting from one location to another location two separate and different formats of digital information each defining the integrated circuit to be made, comparing said two formats, forming from a first of said formats a first artwork depicting a mask for making said integrated circuit, forming from the second of said formats a second artwork depicting said mask for making said integrated circuit, and comparing said artworks to determine whether they correspond.

4. A method as recited in claim 3 and comprising the steps of building an integrated circuit in accordance with the information of said first format, and comparing said built integrated circuit with the information of said second format.

5. A method of processing information for making an integrated circuit comprising the steps of transmitting from a customer's location to a manufacturing plant two separate and different formats of digital information each defining the integrated circuit to be made, forming from a first of said formats a first enlarged artwork, forming from the second of said formats a second enlarged artwork, and comparing said artworks to determine whether they correspond.

6. A method as recited in claim 5 and comprising the steps of building an integrated circuit in accordance with the information of said first format, and comparing said built integrated circuit with the information of said second format.

7. A method of making an integrated circuit comprising the steps of transmitting from one location to another location two separate and different formats of digital information each defining the integrated circuit to be made, forming from a first of said formats a first artwork, forming from the second of said formats a second artwork, comparing said artworks to determine whether they correspond, building an integrated circuit in accordance with the information of said first format, and comparing said built integrated circuit with the information of said second format.

8. A method of processing information for making an integrated circuit comprising the steps of transmitting from a customer's location to a manufacturing plant two separate and different formats of digital information each defining the integrated circuit to be made, forming from a first of said formats a first enlarged artwork depicting a mask for making said integrated circuit, forming from the second of said formats a second enlarged artwork depicting said mask for making said integrated circuit, and comparing said artworks to determine whether they correspond.

9. A method as recited in claim 8 and comprising the steps of building an integrated circuit in accordance with the information of said first format, and comparing said built integrated circuit with the information of said second format.

10. A method of processing information for making an integrated circuit comprising the steps of transmitting from one location to another location two separate and different formats of digital information each defining the integrated circuit to be made, forming from a first of said formats a first enlarged artwork depicting a mask for making said integrated circuit, forming from the second of said formats a second enlarged artwork, and comparing said artworks to determine whether they correspond.

11. A method as recited in claim 10 and comprising the steps of building an integrated circuit in accordance with the information of said first format, and comparing said built integrated circuit with the information of said second format.

* * * * *